(12) United States Patent
Zaffetti

(10) Patent No.: US 11,598,356 B2
(45) Date of Patent: Mar. 7, 2023

(54) FUSED ALIGNMENT PIN

(71) Applicant: HAMILTON SUNDSTRAND CORPORATION, Charlotte, NC (US)

(72) Inventor: Mark A. Zaffetti, Suffield, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 873 days.

(21) Appl. No.: 16/421,937

(22) Filed: May 24, 2019

(65) Prior Publication Data
US 2020/0370579 A1    Nov. 26, 2020

(51) Int. Cl.
*F16B 5/02* (2006.01)
*F16B 19/02* (2006.01)
*F16M 13/02* (2006.01)

(52) U.S. Cl.
CPC .............. *F16B 5/025* (2013.01); *F16B 19/02* (2013.01); *F16M 13/02* (2013.01)

(58) Field of Classification Search
CPC .............. F16B 5/025; Y10T 29/49895; Y10T 29/53913; Y10T 29/49826
See application file for complete search history.

(56) References Cited

U.S. PATENT DOCUMENTS 1,620,731 A * 3/1927 Moorhouse ............ B60K 23/02
74/485
6,209,946 B1   4/2001 Eng
6,817,238 B2 * 11/2004 Go Boncan .......... G01N 33/383
73/866
2007/0193406 A1 *  8/2007 Kabir ........................ F16C 3/10
123/51 AA
2015/0307205 A1   10/2015 Niedermeier et al.

FOREIGN PATENT DOCUMENTS

JP          S5769109 A    4/1982
WO        2017063711 A1   4/2017

OTHER PUBLICATIONS

European Search Report Application No. EP19213358; dated May 4, 2020; pp. 6.

* cited by examiner

*Primary Examiner* — Jason L Vaughan
*Assistant Examiner* — Amanda Kreiling
(74) *Attorney, Agent, or Firm* — Cantor Colburn LLP

(57) ABSTRACT

A mating assembly is provided and includes a first mating component, a second mating component, a bolt to bolt first and second mating components together and an alignment pin. The alignment pin aligns the first and second mating components so that the first and second mating components can be bolted together. The alignment pin is configured to yield upon an application of a specified load thereto. A magnitude of the specified load is less than magnitudes of loads expected to be transferred between the first and second mating components through the bolt once bolting is complete.

11 Claims, 5 Drawing Sheets

FIG. 1
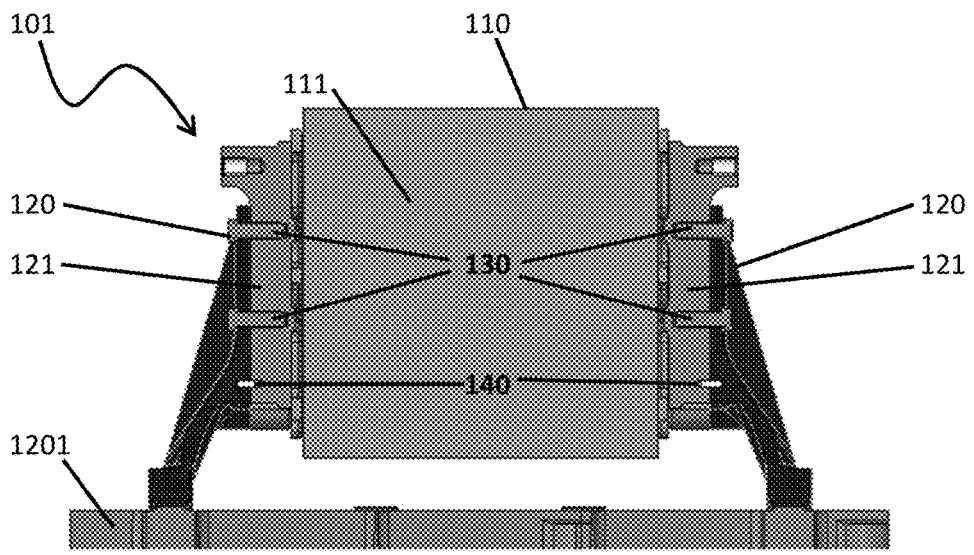
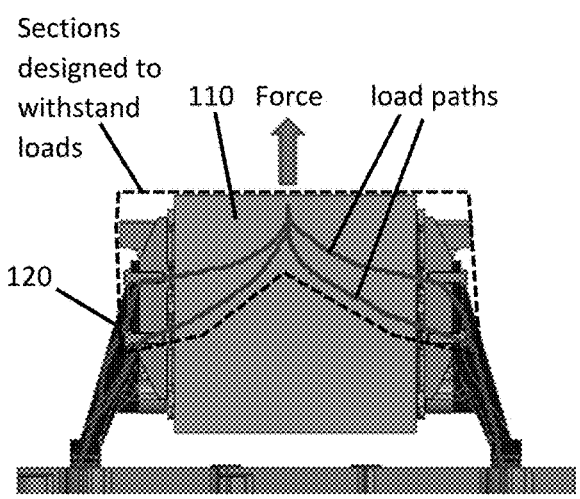
(No alignment pins intact)
FIG. 2A
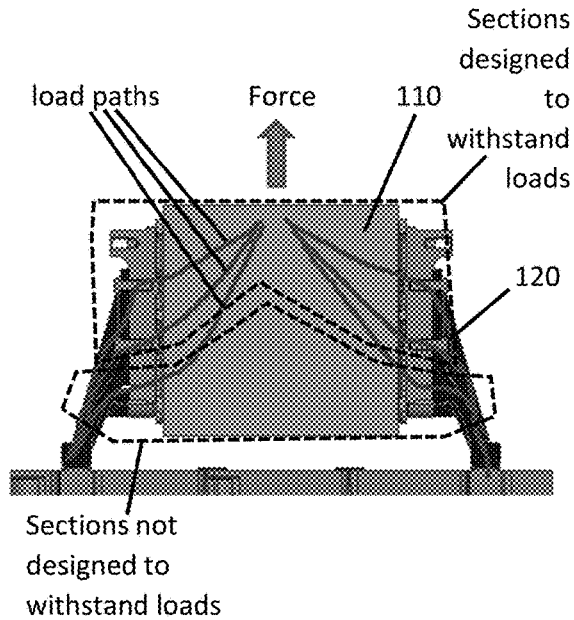
(Alignment pins intact)
FIG. 2B

FUSED ALIGNMENT PIN

BACKGROUND

The following description relates to alignment pins and, more specifically, to fused alignment pin for use in aligning a component to a mounting bracket to which the component is to be bolted.

Alignment pins can be used to align a component to a mounting bracket to which the component is to be bolted. The alignment pins allow for more precise alignment than what would otherwise be possible with just a bolted connection and such precision is often required to properly locate the component to the mating mounting surface of the mounting bracket prior to bolting.

Typically, alignment pins are made of steel or other strong materials. As such, the location of the alignment pins, if the alignment pins are left in place once bolting is completed, can now act as a load path that alters an intended load pathway through the component and the mounting bracket and hence where stresses occur in the component and the mounting bracket as a result of loading.

In addition to acting as effective load paths, alignment pins remaining intact following bolting can act as restraints during exposure to different thermal environments. In this way, the alignment pins can restrict thermal growth of the component or the mounting bracket in areas other than those of the bolted connections and thus create stresses in the component or the mounting bracket that normally would not exist.

BRIEF DESCRIPTION

According to an aspect of the disclosure, a mating assembly is provided and includes a first mating component, a second mating component, a bolt to bolt first and second mating components together and an alignment pin. The alignment pin aligns the first and second mating components so that the first and second mating components can be bolted together. The alignment pin is configured to yield upon an application of a specified load thereto. A magnitude of the specified load is less than magnitudes of loads expected to be transferred between the first and second mating components through the bolt once bolting is complete.

In accordance with additional or alternative embodiments, the first mating component includes a vehicle component and the second mating component comprises a mounting bracket.

In accordance with additional or alternative embodiments, the bolt is provided as multiple bolts and the alignment pin is provided as multiple alignment pins.

In accordance with additional or alternative embodiments, the alignment pin is notched at respective mating surfaces of the first and second mating components.

In accordance with additional or alternative embodiments, the material of the alignment pin has a lower yield strength than materials of the first and second mating components and materials of the bolt.

According to another aspect of the disclosure, an alignment pin is provided to align first and second mating components so that the first and second mating components can be bolted together. The alignment pin includes a body having a first end tightly fittable into the first mating component and a second end tightly fittable into the second mating component. A geometry of the body is configured to facilitate alignment of the first and second mating components prior to bolting and to cause the body to yield upon an application of a specified load thereto. A magnitude of the specified load is less than magnitudes of loads expected to be transferred between the first and second mating components once bolting is complete.

In accordance with additional or alternative embodiments, the alignment pin includes a rigid or semi-rigid material.

In accordance with additional or alternative embodiments, the alignment pin is substantially straight from the first end to the second end.

In accordance with additional or alternative embodiments, the first end is tapered and the second end is tapered.

In accordance with additional or alternative embodiments, the alignment pin is hollow.

In accordance with additional or alternative embodiments, the alignment pin has a notch between the first end and the second end.

In accordance with additional or alternative embodiments, the notch is located at respective mating surfaces of the first and second mating components.

In accordance with additional or alternative embodiments, the notch extends around a circumferential entirety of the body.

In accordance with additional or alternative embodiments, the body has a substantially uniform diameter at the first and second ends and a reduced diameter at the notch.

According to another aspect of the disclosure, an alignment pin is provided to align first and second mating components so that the first and second mating components can be bolted together. The alignment pin includes a body having a first end tightly fittable into the first mating component and a second end tightly fittable into the second mating component. The body is formed of a material that has a yield strength whereby the body yields upon an application of a specified load thereto. A magnitude of the specified load is less than magnitudes of loads expected to be transferred between the first and second mating components once bolting is complete.

In accordance with additional or alternative embodiments, the alignment pin is substantially straight from the first end to the second end.

In accordance with additional or alternative embodiments, the first end is tapered and the second end is tapered.

In accordance with additional or alternative embodiments, the alignment pin is hollow.

In accordance with additional or alternative embodiments, the material of the alignment pin has a lower yield strength than materials of the first and second mating components.

In accordance with additional or alternative embodiments, the material of the alignment pin has a lower yield strength than materials of bolts to bolt the first and second mating components together.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

FIG. 1 is a side view of a mating assembly with alignment pins in accordance with embodiments;

FIG. 2A is a schematic diagram illustrating load paths of the mating assembly of FIG. 1 with alignment pins no longer intact;

FIG. 2B is a schematic diagram illustrating load paths of the mating assembly of FIG. 1 with alignment pins intact;

Figure 3:
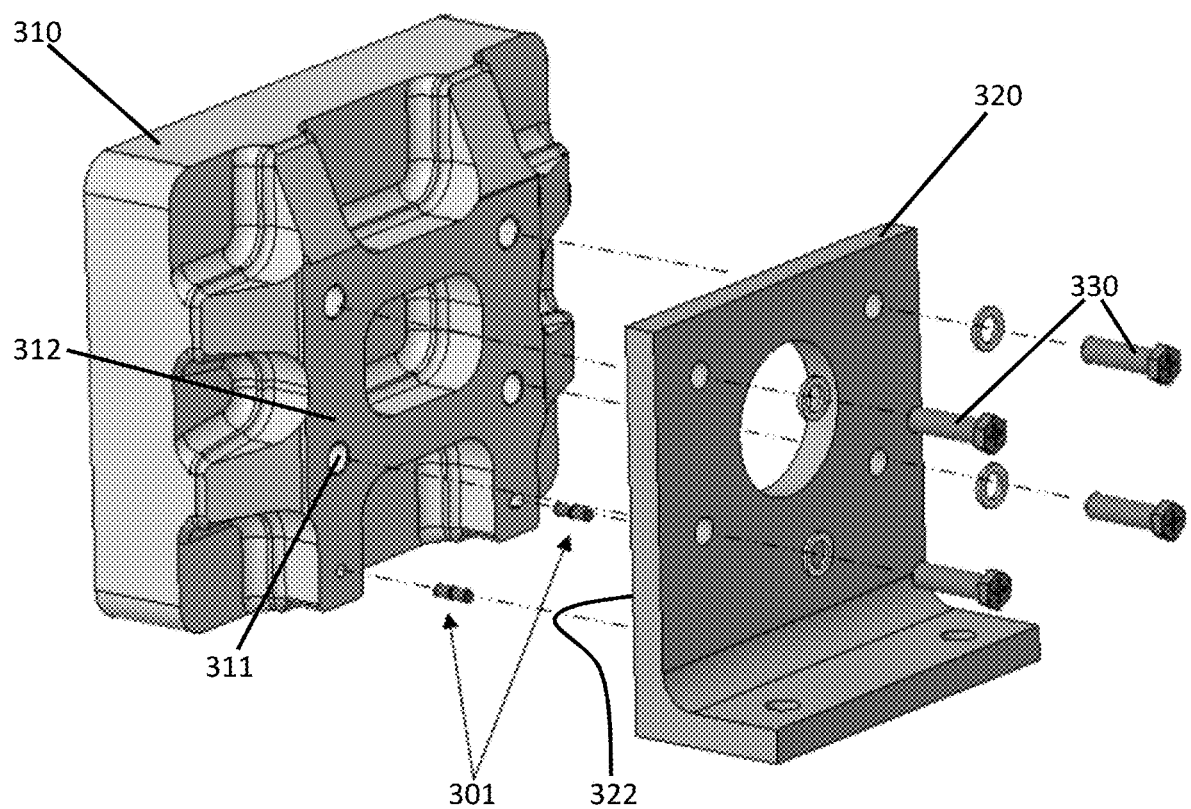
FIG. 3 is an exploded perspective view of a mating assembly with alignment pins in accordance with embodiments.

These and other advantages and features will become more apparent from the following description taken in conjunction with the drawings.

DETAILED DESCRIPTION

Typical loads travelling through mating components can be inertial loads (g-force loads during a launch of a space vehicle), thermal loads, deflection loads, loads imparted by other connecting hardware (such as tubing), etc. These loads will place various combinations of shear, axial, bending and torsional stresses on bolts connecting the mating components. With the loads in mind, the locations of the bolts and the paths between the locations to mounting surfaces of the mating components, are designed to withstand the stresses. In an event, however, that alignment pins used to align the mating components prior to bolting start taking loads unexpectedly, the loads and the stresses in the mating components are altered and the mating components may deform or, in some cases, fail as a result.

Thus, as will be described below, a fused alignment pin is provided to deform or fail at a specified load level in order to alleviate issues associated with alignment pins forming unexpected load paths while still allowing the fused alignment pin to perform component alignment during assembly. The fused alignment pin has at least one of a relatively weak material and an altered geometry such that the alignment pin deforms or fails upon application of the specified load thereto. Therefore, when any significant load above and beyond the specified load is generated (i.e., due to inertial loads, thermal loads, deflection loads, loads imparted by other connecting hardware, etc.), in an event this load tries to pass through the location of the fused alignment pin, the fused alignment pin will yield and no longer present a load path. This will force the load to be transferred through bolts and other parts of mating components that are designed to take the load.

With reference to FIG. 1, a mating assembly 101 is provided and includes a first mating component 110, which can be provided as a vehicle or space vehicle component 111, for example, a second mating component 120, which can be provided as a mounting bracket 121 that is secured to a fixture 1201, such as a fuselage of a vehicle or space vehicle, one or more bolts 130 and one or more alignment pins 140. The one or more bolts 130 are disposed and configured to bolt first and second mating components 110 and 120 together. The one or more alignment pins 140 are disposed and configured to align the first and second mating components 110 and 120 so that the first and second mating components 110 and 120 can be bolted together. The one or more alignment pins are also disposed and configured to yield upon an application of a specified load thereto. A magnitude of the specified load is less than magnitudes of loads expected to be transferred between the first and second mating components 110 and 120 through the one or more bolt 130 once bolting of the first and second mating components 110 and 120 together is complete.

Where the mating assembly 101 is deployed in a vehicle or space vehicle or any other vehicle, the loads that are typically applied to the mating assembly 101 can include, but are not limited to, inertial loads, thermal loads, deflection loads, loads imparted by other connecting hardware, etc. The respective magnitudes of these loads can be known and expected and the first and second mating components 110 and 120 as well as the one or more bolts 130 are designed in such a way as to be able to withstand the loads. In an event, however, that the one or more alignment pins 140 remain intact once the bolting of the first and second mating components 110 and 120 together is complete, the first and second mating components 110 and 120 as well as the one or more bolts 130 can be subject to unexpected loads that they may not be designed to withstand.

The scenario described above can be seen with reference to FIGS. 2A and 2B.

In FIG. 2A, the bolting of the first and second mating components 110 and 120 together is complete and none of the alignment pins 140 remain intact due to alignment pin yielding upon the application of the specified load to the one or more alignment pins 140 (see FIG. 1). Thus, load paths that extend from the second mating component 120 to the first mating component 110 through only the one or more bolts 130 exist and remain within only those sections of the first and second mating components 110 and 120 which are designed to withstand the loads.

By contrast, in FIG. 2B, the bolting of the first and second mating components 110 and 120 together is complete but conventional alignment pins that are not configured to yield upon the application of the specified load thereto do remain intact. Thus, load paths that extend from the second mating component 120 to the first mating component 110 through the one or more bolts 130 and through the conventional alignment pins both exist. Here, those load paths that extend through the remaining intact conventional alignment pins can extend within certain sections of the first and second mating components 110 and 120 which are not designed to withstand the loads.

With reference to FIGS. 3-6, an alignment pin 301 is provided to align first and second mating components 310 and 320 so that the first and second mating components 310 and 320 can be bolted together by bolts 330. The alignment pin 301 can be usable in the embodiments of FIGS. 1 and 2A and the first and second mating components 310 and 320 can be the same as or similar to the first and second mating components 110 and 120 of FIGS. 1 and 2A.

The alignment pin 301 can be provided as multiple alignment pins 301. In any case, each alignment pin 301 includes a body 340 that has a first end 341 and a second end 342 opposite the first end 341. The first end 341 is tightly fittable into a recess 311 of the first mating component 310 and the second end 342 is tightly fittable into a recess 321 of the second mating component 320. Since the recesses 311 and 321 correspond in position with the bolt holes of the first and second mating components 310 and 320, the alignment pins 301 can be used to align the first and second mating components 310 and 320 for bolting.

The body 340 of each alignment pin 301 has a geometry 350 that is configured to facilitate alignment of the first and second mating components 310 and 320 prior to bolting. That is, the body 340 is at least one or more of substantially straight from the first end 341 to the second end 342 and formed of a rigid or semi-rigid material, such as steel, aluminum, ceramic, plastic, titanium or another suitable metal, metallic alloy or non-metallic material. In addition, geometry 350 of the body 340 is further configured to cause the body 340 to yield upon an application of a specified load. A magnitude of the specified load is less than magnitudes of loads expected to be transferred between the first and second mating components 310 and 320 once the bolting of the first and second mating components 310 and 320 together is complete.

In accordance with various embodiments, the first end 341 and the second end 342 can be tapered and the alignment pin 301 can be solid or hollow.

Figure 4:
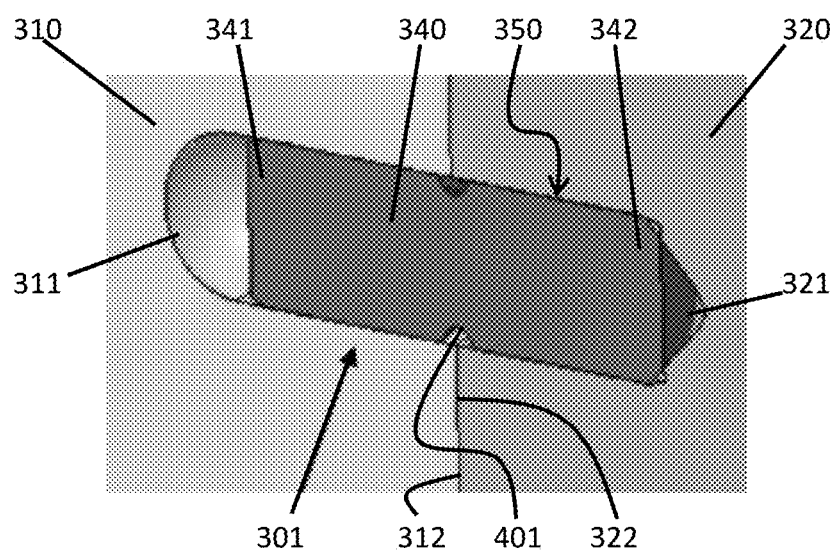
FIG. 4 is an enlarged portion of FIG. 3.
Figure 5:
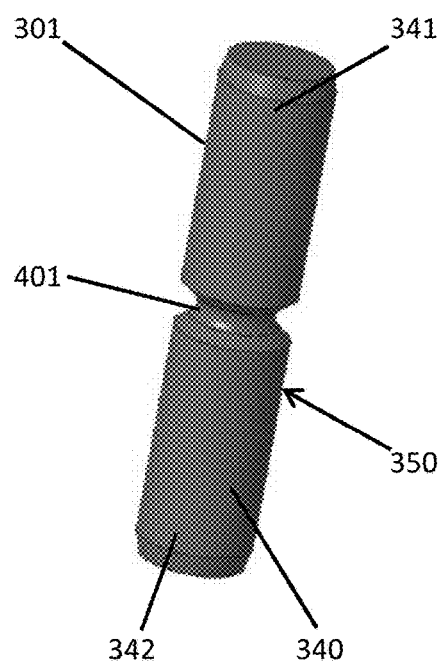
FIG. 5 is a perspective view of an alignment pin with a notch in accordance with further embodiments.

As shown in FIGS. 4 and 5, the geometry 350 of the body 340 of the alignment pin 301 can be such that the alignment pin 301 has a notch 401 between the first end 341 and the second end 342. The notch 401 can be located at respective mating surfaces 312 and 322 of the first and second mating components 310 and 320. In accordance with embodiments, the notch 401 can extend around a circumferential entirety of the body 340 or, more particularly, the body 340 can have a substantially uniform diameter at the first and second ends 341 and 342 and a reduced diameter at the notch 401. In any case, the notch 401 serves as a stress concentration location that is designed to yield and deform or fail due to applied loads at specified load levels.

Figure 6:
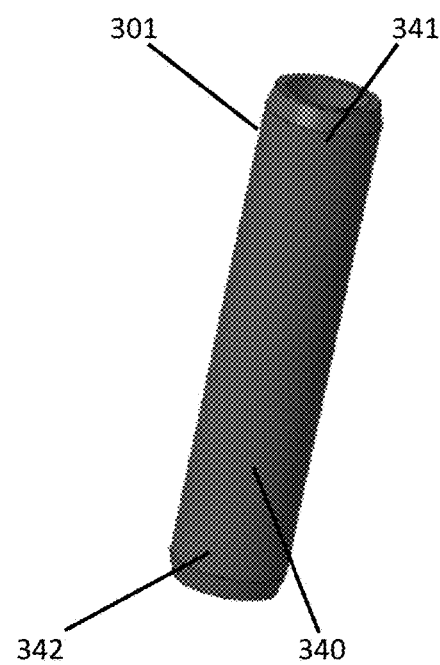
FIG. 6 is a perspective view of a hollow alignment pin without a notch in accordance with further embodiments.

As shown in FIGS. 5 and 6, the body 340 can be solid and filled (see FIG. 5) or hollow (see FIG. 6).

Figure 7:
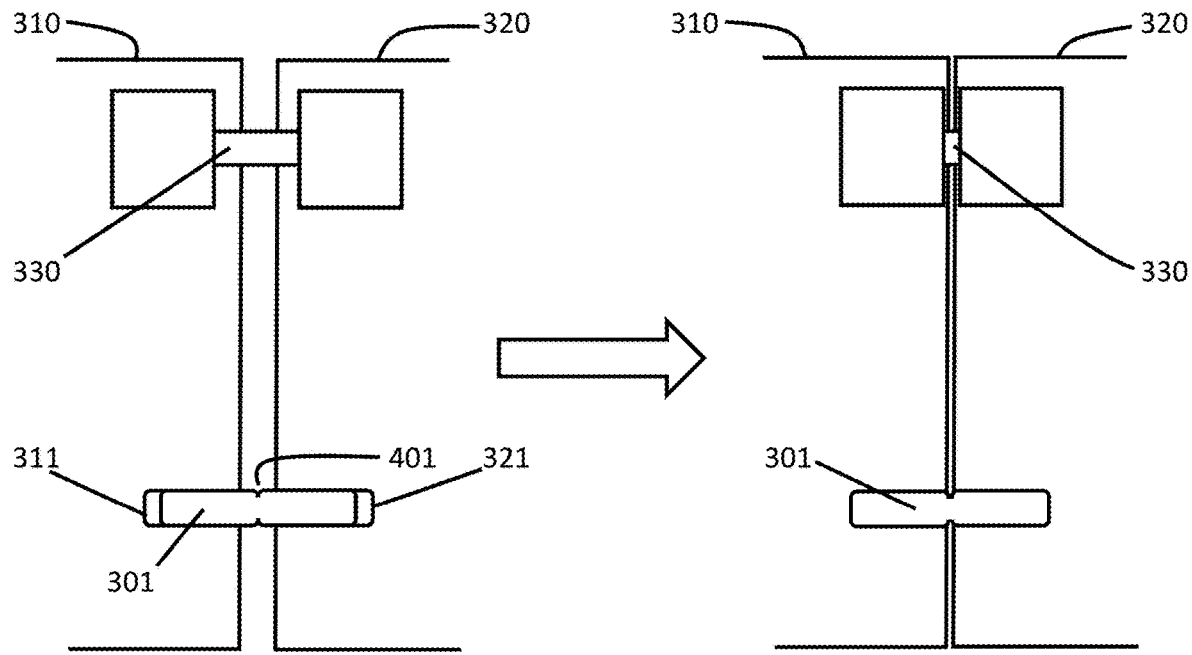
FIG. 7 is a schematic side view of an illustration of an operation of an alignment pin in accordance with embodiments.
Figure 7:
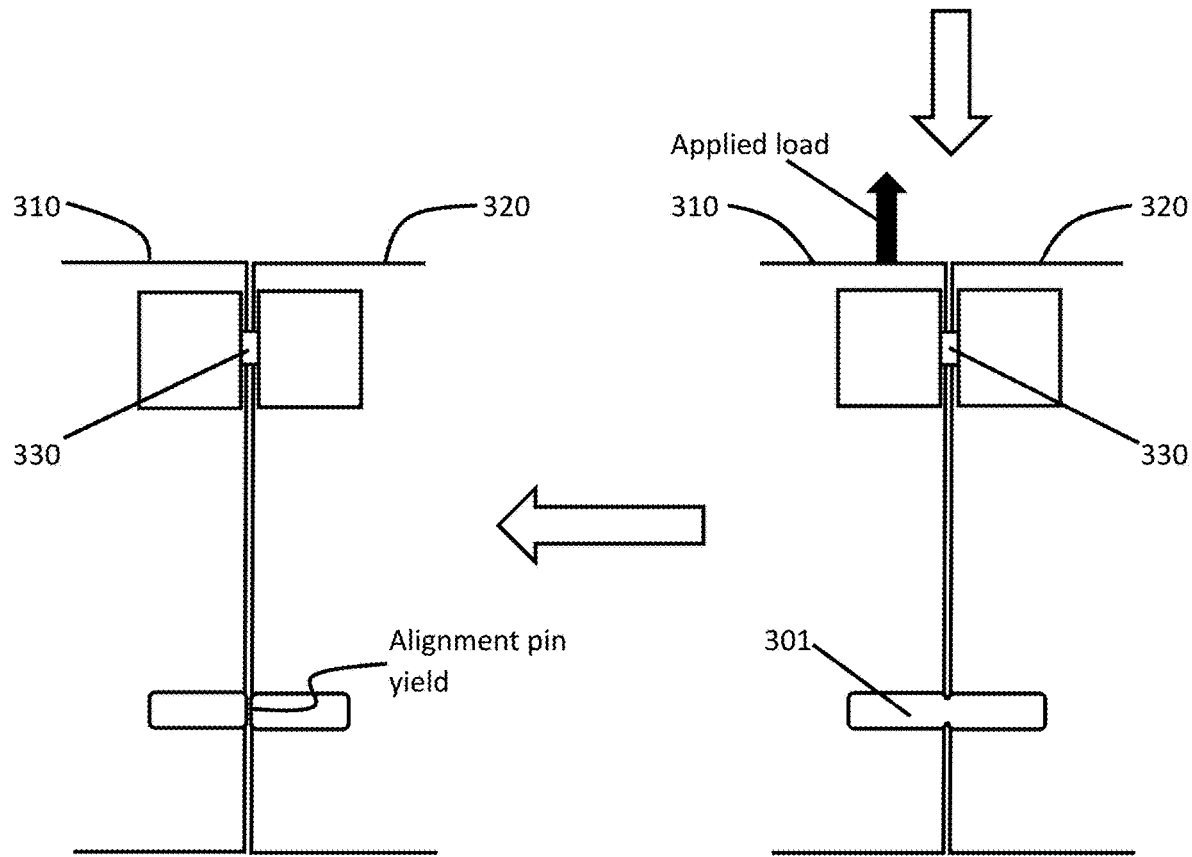

With reference to FIG. 7, a use of an alignment pin 301 is illustrated. The first image shows that the alignment pin 301 can be used to align first and second mating parts 310 and 320 as the alignment pin 301 is receivable in the recesses 311 and 312 during a bolting operation in which the first and second mating parts 310 and 320 are bolted together by bolt 330. The second image shows that the first and second mating parts 310 and 320 are completely bolted together at which point load paths exist from the first mating part 310 to the second mating part 320 through the bolt 330 and the alignment pin 301. The third image shows that a specified load is applied to the first mating part 310 which is sufficient to cause the alignment pin 301 to yield. The fourth image shows that the alignment pin 301 has yielded at the location of the notch 401 due to the specified load being applied such that load paths exist from the first mating part 310 to the second mating part 320 through only the bolt 330.

Figure 8:
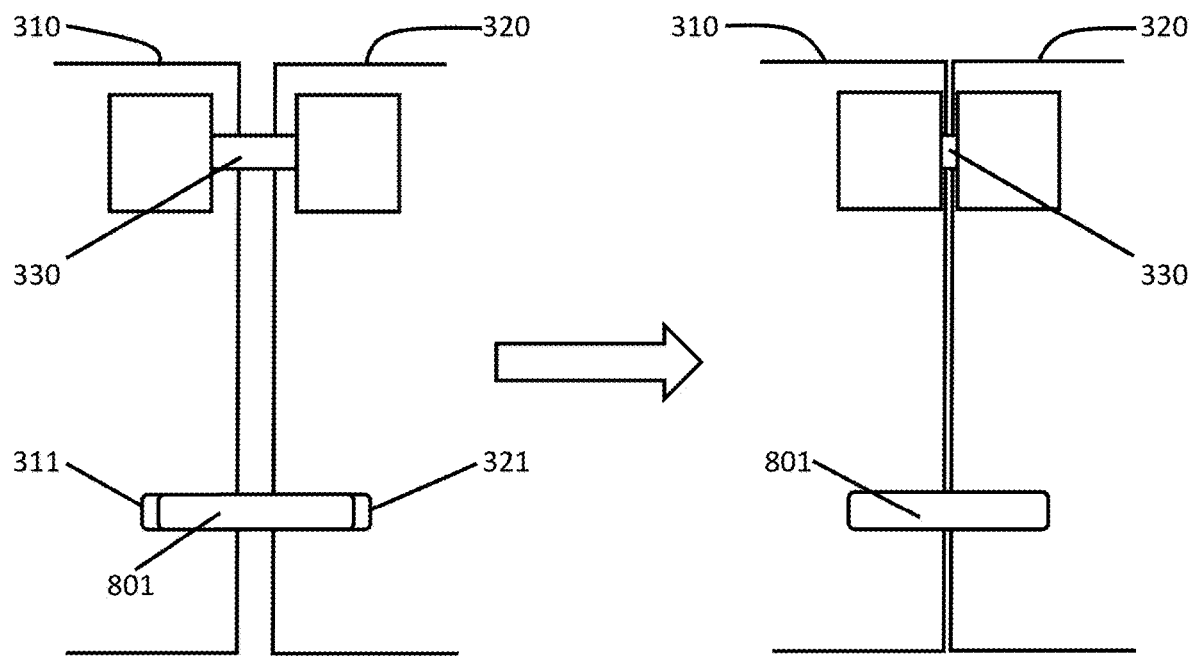
FIG. 8 is a schematic side view of an illustration of an operation of an alignment pin in accordance with embodiments.
Figure 8:
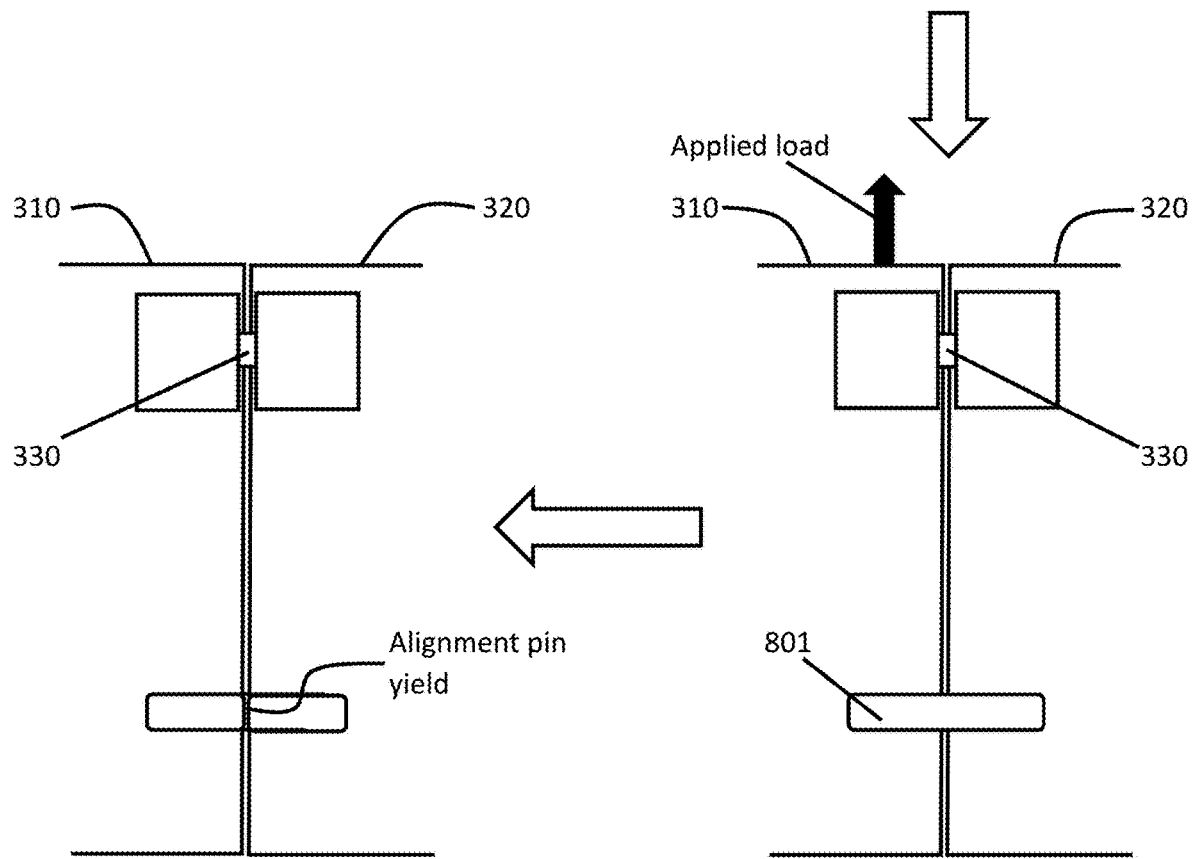

With reference to FIG. 8, a use of an alignment pin 801 is illustrated and is similar to the usage illustrated in FIG. 7 so it does not need to be discussed again. In this case, however, the body 340 of the alignment pin 801 is formed of a material that has a yield strength. This yield strength is such that the body 340 yields upon an application of a specified load shown in the third image of FIG. 8. As above, the magnitude of the specified load at which the body 340 yields is less than magnitudes of loads expected to be transferred between the first and second mating components 310 and 320 once bolting by bolt 330 is complete.

In accordance with embodiments, the material of the alignment pin 801 has a lower yield strength than materials of the first and second mating components 310 and 320. In accordance with further embodiments, the material of the alignment pin 801 has a lower yield strength than materials of the bolt(s) 330 to bolt the first and second mating components 310 and 320 together.

Technical effects and benefits are the provision of alignment pins that can be used during a bolting of mating components together but not act as load carrying features once the bolting is complete. The alignment pins also allow for the provision of a mating assembly that does not require the addition of holes for the removal of alignment pins.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A mating assembly, comprising:
    a first mating component;
    second mating components;
    a first plurality of bolts to bolt a first side of the first mating component to one of the second mating components and a second plurality of bolts to bolt a second side of the first mating component to another one of the second mating components; and
    alignment pins to align the first side of the first mating component to the one of the second mating components and to align the second side of the first mating component to the another one of the second mating components so that the first and second mating components can be bolted together,
    each of the alignment pins being configured to yield upon an application of a specified load thereto, and
    a magnitude of the specified load being less than magnitudes of loads expected to be transferred between the first and second mating components through the first and second pluralities of bolts once bolting is complete.

2. The mating assembly according to claim 1, wherein the first mating component comprises a vehicle component and the second mating components each comprise a mounting bracket secured to fuselage of a space vehicle.

3. The mating assembly according to claim 1, wherein each of the alignment pins is notched at respective mating surfaces of the first and second mating components.

4. The mating assembly according to claim 1, wherein the material of each of the alignment pins has a lower yield strength than materials of the first and second mating components and materials of each of the bolts.

5. An alignment pin to align first and second mating components so that the first and second mating components can be bolted together, the alignment pin comprising:
    a body having a first end tightly fittable into the first mating component and a second end tightly fittable into the second mating component,
    a geometry of the body being configured to facilitate alignment of the first and second mating components prior to bolting and to cause the body to yield upon an application of a specified load thereto, a magnitude of the specified load being less than magnitudes of loads expected to be transferred between the first and second mating components once bolting is complete, wherein the alignment pin has a notch between the first end and the second end and the notch is located at respective mating surfaces of the first and second mating components, which extend into open space of the notch.

6. The alignment pin according to claim 5, wherein the alignment pin comprises a rigid or semi-rigid material.

7. The alignment pin according to claim 5, wherein the alignment pin is substantially straight from the first end to the second end.

8. The alignment pin according to claim 5, wherein the first end is tapered and the second end is tapered.

9. The alignment pin according to claim 5, wherein the alignment pin is hollow.

10. The alignment pin according to claim 5, wherein the notch extends around a circumferential entirety of the body.

11. The alignment pin according to claim 5, wherein the body has a substantially uniform diameter at the first and second ends and a reduced diameter at the notch.

\* \* \* \* \*